United States Patent

Wang

[11] Patent Number: 5,982,124
[45] Date of Patent: Nov. 9, 1999

[54] METHOD AND APPARATUS FOR ADAPTIVE CONTROL OF A VEHICLE POWER WINDOW

[75] Inventor: John Y. Wang, Wixom, Mich.

[73] Assignee: TRW Inc., Lyndhurst, Ohio

[21] Appl. No.: 08/886,372

[22] Filed: Jul. 1, 1997

Related U.S. Application Data

[63] Continuation of application No. 08/521,540, Aug. 30, 1995, abandoned.

[51] Int. Cl.$^6$ ..................................................... G05B 5/00
[52] U.S. Cl. ........................ 318/466; 318/286; 318/446; 318/461; 49/140
[58] Field of Search .................................. 318/445–487, 318/280–300; 49/139–140

[56] References Cited

U.S. PATENT DOCUMENTS

| | | | |
|---|---|---|---|
| 3,891,909 | 6/1975 | Newson | 318/469 |
| 4,096,579 | 6/1978 | Black et al. | 318/603 |
| 4,394,605 | 7/1983 | Terazawa | 318/280 |
| 4,468,596 | 8/1984 | Kinzl et al. | 318/287 |
| 4,628,234 | 12/1986 | Mizuta et al. | 318/267 |
| 4,641,067 | 2/1987 | Iizawa et al. | 318/287 |
| 4,686,598 | 8/1987 | Herr | 318/286 |
| 4,746,845 | 5/1988 | Mizuta et al. | 318/286 |
| 4,831,315 | 5/1989 | Hammond et al. | 318/572 |
| 4,900,994 | 2/1990 | Mizuta | 318/283 |
| 5,069,000 | 12/1991 | Zuckerman | 49/28 |
| 5,162,711 | 11/1992 | Heckler | 318/264 |
| 5,278,480 | 1/1994 | Murray | 318/626 |
| 5,410,226 | 4/1995 | Sekiguchi et al. | 318/266 |
| 5,416,395 | 5/1995 | Hiramatsu et al. | 318/600 |
| 5,436,539 | 7/1995 | Wrenbeck et al. | 318/265 |
| 5,497,326 | 3/1996 | Berland et al. | 318/468 |

*Primary Examiner*—David Martin
*Attorney, Agent, or Firm*—Tarolli, Sundheim, Covell, Tummino & Szabo

[57] ABSTRACT

An adaptive vehicle power window control apparatus (20) includes an electric motor (28) for moving a member (34) between a first position and a second position. The space between the first position and the second position is divided into a plurality of trap zones and each zone has an associated sensitivity value. A controller 24 determines (40) a value functionally related to the present motor speed and determines (44) a value functionally related to a reference motor speed. The sensitivity value is adjusted as a function of the two determined values. A window zone determining function (62) determines which of the plurality zones the member (34) is located. The value functionally related to present motor speed is adjusted (52) as a function of the sensitivity value for the zone that the member is located. A comparing function (48) compares the adjusted value with the value functionally related to reference motor speed. The motor direction and movement is controlled as a function of the comparison. Zone locations are adjustable with a calibration procedure.

22 Claims, 7 Drawing Sheets

METHOD AND APPARATUS FOR ADAPTIVE CONTROL OF A VEHICLE POWER WINDOW

This application is a continuation of copending application Ser. No. 08/521,540, filed on Aug. 30, 1995, now abandoned.

TECHNICAL FIELD

The present invention is directed to vehicle power windows and is particularly directed to a method and apparatus for adaptively controlling a power window having an anti-trap feature.

BACKGROUND OF THE INVENTION

Vehicle power window systems use a reversible electric motor to open and close an associated window. Typical systems include a bi-directional window switch electrically connected to the reversible electric motor. The motor is operatively connected to an opening and closing mechanism attached to the associated window. When the switch is manually operated and held in position by a vehicle occupant, electric current is supplied to the motor causing the motor to rotate in a desired direction. When the motor rotates, the opening and closing mechanism opens or closes the window. When the window switch is released, the motor rotation stops and the window movement stops.

Some power window systems have an automatic operation feature. In an automatic operating mode, a single movement and release of the window switch causes the window to fully open or fully close even though the switch has been released. Some automatic mode power window systems include what is referred to in the art as an "anti-trap" feature. The anti-trap feature is designed to prevent closing of the window on an obstruction, e.g., part of an occupants body, and "trapping" the obstruction in the window. When the window is moving in an upward direction and an obstruction is encountered in the path of the window, a typical power window anti-trap system senses that an obstruction is resisting continued upward window movement. Upon detecting the increased resistance to movement, the anti-trap system reverses the window direction.

SUMMARY OF THE INVENTION

The present invention provides a method and apparatus for controlling a motor for moving a member from a first location to a second location. The space between the first location and the second location is divided into a plurality of zones. The motor operation is monitored in the zones. The motor is controlled in response to the monitored motor operation.

In accordance with one embodiment of the present invention, an apparatus for controlling an electric motor for moving a member from a first location to a second location comprises means for sensing a value of an operating parameter of the motor while the motor is energized. Means are provided for storing zone dependent values for a plurality of member zone locations between the first and the second locations. Each zone dependent value is functionally related to an expected value of the operating parameter of the motor associated with a zone location. Means are provided for comparing the expected value of the operating parameter of the motor against a value functionally related to the stored zone dependent value associated with the present zone location of the member. The apparatus further comprises means for controlling motor operation in response to the comparison.

In accordance with another aspect of the present invention, a method for controlling an electric motor moving a member from a first location to a second location comprises the steps of sensing a value of an operating parameter of the motor while the motor is energized, and storing zone dependent values for a plurality of member zone locations located between the first and the second locations. Each of the stored zone dependent values are functionally related to an expected value of the operating parameter of the motor associated with a zone location. The method further comprises the steps of comparing the expected value of the operating parameter of the motor against a value functionally related to the stored zone dependent value associated with the present zone location of the member, and controlling motor operation in response to the comparison.

BRIEF DESCRIPTION OF THE DRAWINGS

Further features and advantages of the present invention will be apparent to those skilled in the art to which the present invention relates from reading the following detailed description with reference to the accompanying drawings, in which.

DESCRIPTION OF PREFERRED EMBODIMENT

Figure 1:
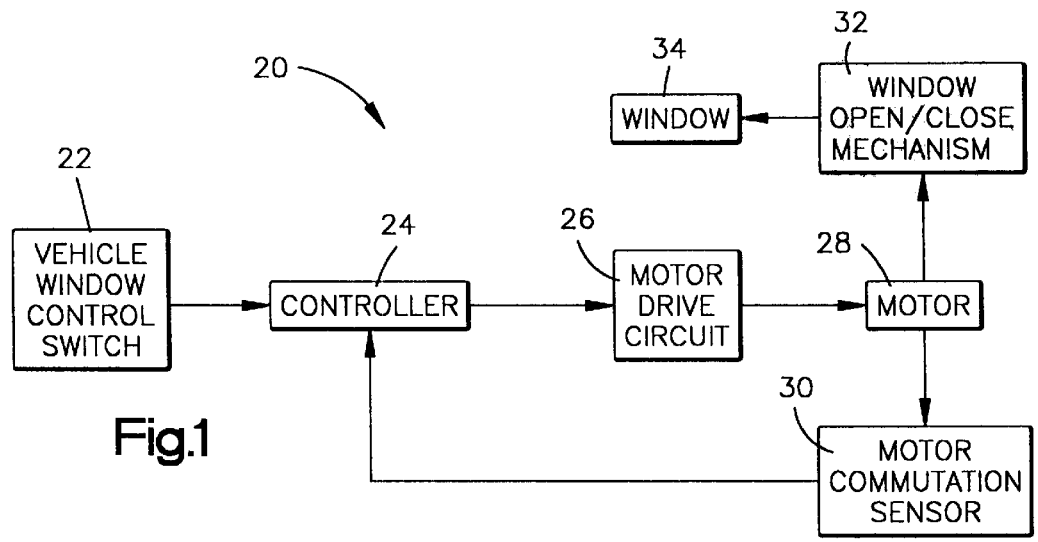
FIG. 1 is a schematic block diagram of an adaptive power window control system made in accordance with the present invention.

An adaptive vehicle power window anti-trap system 20 is shown in FIG. 1. Power window system 20 includes a vehicle window control switch 22 electrically connected to a controller 24. Window switch 22 is a bi-directional switch resiliently biased to a central neutral position. Controller 24 is electrically connected to a motor drive circuit 26. Controller 24 is preferably a micro-computer having internal memories and internal timers used to time out various functions carried out by controller 24. Motor drive circuit 26 preferably includes transistor switches (not shown) controllably connected to relay switches (not shown). Controller 24 provides a control signal to an appropriate transistor switch, which, in turn, actuates a relay switch. The relay switches are electrically connected between a source of electric power, such as a vehicle battery, and an electric motor 28. When a relay switch is actuated, electric current flows from the source of electric power through the relay switch thereby energizing motor 28 for rotation in the selected direction.

Motor 28 is preferably a permanent magnet, bi-directional, direct current motor. A motor commutation sensor 30 is operatively connected to motor 28. Preferably, the sensor 30 is a Hall-effect device. The Hall-effect commutation sensor 30 provides an electric pulse signal when motor rotation causes a magnetic pole of motor 28 to pass the sensor 30. Other types of sensors may be used to detect motor commutation, such as optical sensors or mechanical switch contacts.

In accordance with a preferred embodiment, motor 28 has two magnetic poles, i.e., north and south. Motor commutation sensor 30 provides an electric pulse signal to controller 24 each time a magnetic pole passes the sensor 30. Two pulses are provided for each full revolution of motor 28. The pulse signals are used by controller 24 to determine (i) values functionally related to motor speed, and (ii) the position of an associated vehicle window 34.

Motor 28 is operatively connected to window open/close mechanism 32. Window open/close mechanism 32 is operatively connected to the window 34. When motor 28 rotates in one direction, window open/close mechanism 32 moves window 34 in a direction which opens the window. When motor 28 rotates in the other direction, window open/close mechanism 32 moves window 34 in a direction which closes the window.

Figure 2:
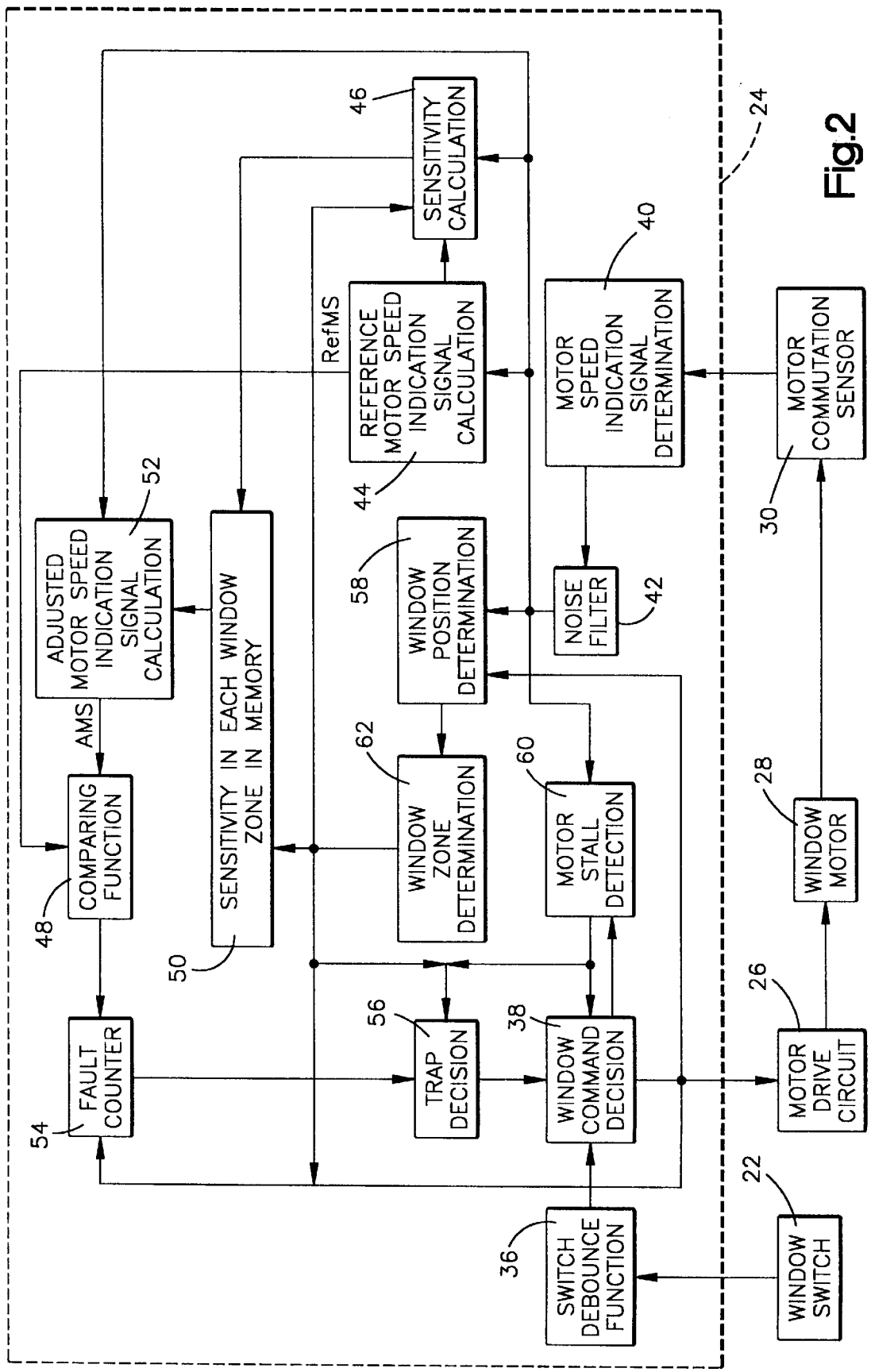
FIG. 2 is a functional block diagram of the controller shown in FIG. 1.
Figure 3:
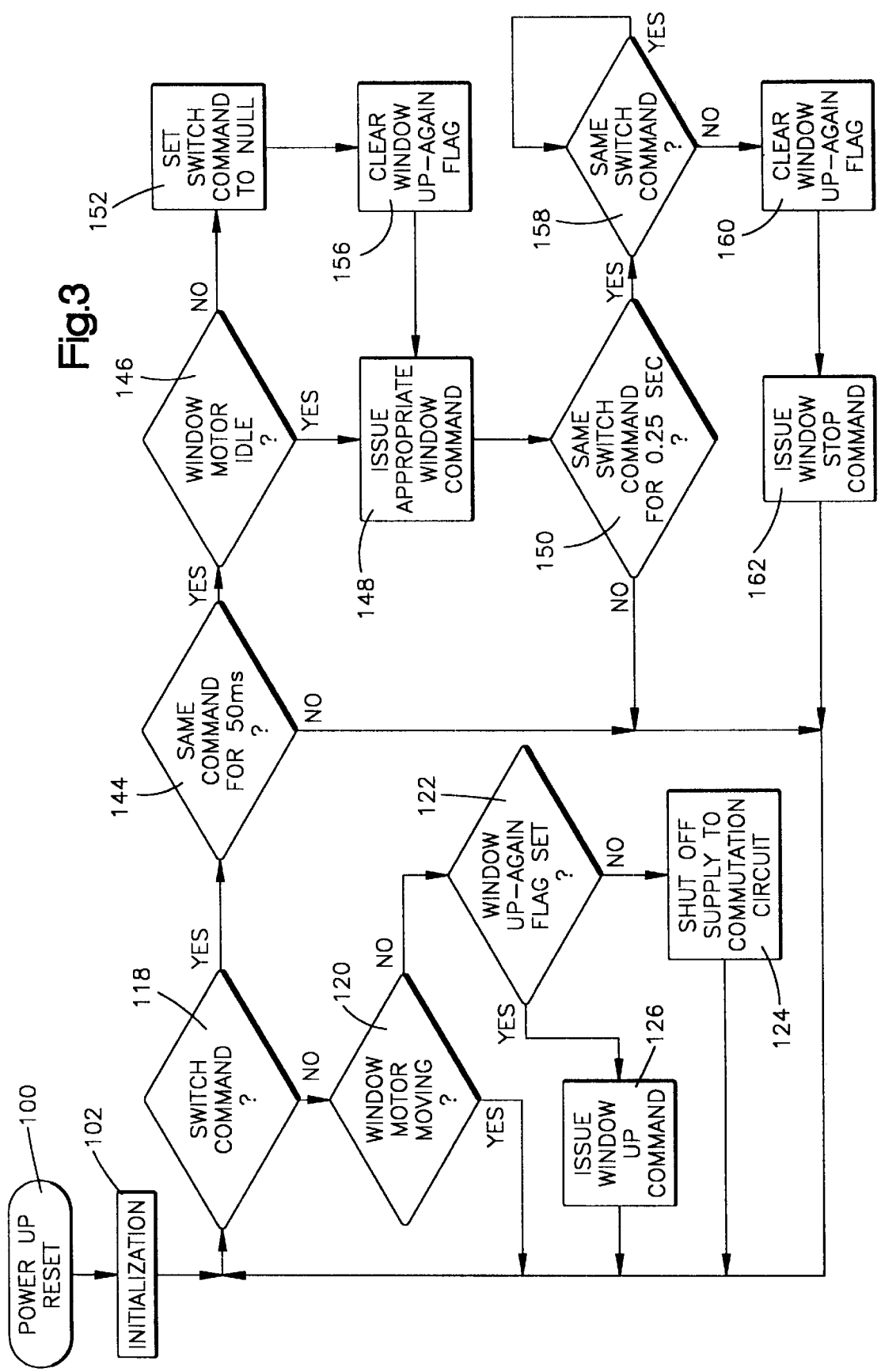

Referring to FIG. 2, controller 24 includes a switch debounce function 36. Switch debounce function 36 monitors the electric switch signal from window switch 22 to determine whether electrical contacts in switch 22 have made "true contact." When switch 22 is actuated in one direction, an associate switch contact occurs. When switch 22 is actuated in the other direction, a different switch contact occurs. Debounce function 36 monitors the electric switch signal condition. If the switch signal indicates the switch is actuated in one position throughout the 50 millisecond time period, the switch signal is considered valid and is provided as an input to a window command decision function 38.

Window command decision function 38 is controllably connected to motor drive circuit 26. Window command decision function 38 determines (i) the appropriate window command to be executed, and (ii) provides the appropriate command to control motor 28, i.e. up, down, or stop. Factors utilized by the window command decision function 38 in determining the appropriate window command include (i) whether an internal trap flag is set, (ii) detection of a stall condition, (iii) whether a window up-again flag is set, and (iv) whether the vehicle occupant is operating the power window in a manual or automatic mode.

The internal trap flag is set in controller 24 when (i) a "soft trap" is detected in a vehicle window "anti-trap zone," or (ii) a window stall condition occurs while the window is moving in an upward direction in the "anti-trap zone." The "anti-trap zone" is that area of window position between an almost fully closed position to approximately a half opened position. Window position is preferably measured from the top of the window frame, i.e., relative to the fully closed position. For the purpose of explanation, the following example is used in which the anti-trap zone is defined as that area between 4 mm from the window fully closed position to approximately 260 mm from the window fully closed position where the fully opened window is 500 mm from the top of the window frame. The anti-trap zone is preferably divided into 32 approximately equal sub-zones identified as $SZ_2$–$SZ_{33}$. Each sub-zone is approximately 8 mm in length in a direction parallel to the direction of movement of the window. An area referred to as the maximum trap zone, $Z_{34}$, is that position between the 260 mm position from the fully closed position to the fully opened position at 500 mm from the top of the window frame. An area referred to as the no-trap zone, $Z_1$, is that position between 4 mm from the fully closed position to the fully closed position, i.e., from 4 mm to the top of the window frame. There may be a different number and size of the zones and sub-zones described above if desired. Furthermore, the zones and sub-zones may be selected based on vehicle type.

Trap force, as used in this application, is the amount of force that resists window movement. A "soft trap" occurs when an obstruction is of a type that does not prevent the window from continuing in an upward direction but does resist such movement. A window stall, on the other hand, is considered to be a "hard trap" and occurs when controller 24 provides a window command signal actuating motor drive circuit 26, thereby energizing window motor 28, and the motor stops rotating for a predetermined time period. The trap flag is set when either a soft trap or a stall condition is detected and the window is operating in the automatic mode in an upward direction and the window position is within one of the anti-trap zones or sub-zones. The amount of trap force or resistance to upward movement that must occur before the trap flag is set is dependent upon which trap zone the window is located. The amount of trap force needed to set the trap flag is adapted or adjusted in response to the system performance. As will be explained below, when the window is operating in the automatic mode in a downward direction and a stall condition is detected, controller 24 issues a window stop command. In the manual mode, the operator switch command overrides the controller functions until the switch is released.

The window up-again flag is set after the trap flag is initially set upon detecting a "soft trap" or stall condition during an automatic window-up command execution. When a soft trap or stall condition occurs, an automatic window down command is executed by the window command decision function 38 thereby reversing the direction of window movement. When set, the window up-again flag causes an automatic window-up command to be again executed once the window proceeds in the automatic down mode to the full window open position. If the obstruction is still in the window when the window is again moving in an upward direction, thereby causing a second trap or stall condition, controller 24 (i) reverses direction of the window a second time by issuing an automatic window down command to actuate motor 28, and (ii) clears the window up-again flag thereby leaving the window in the full open position.

Upon evaluating the factors described above, controller 24 provides the appropriate control signal to motor drive circuit 26 to thereby execute the appropriate window command. Motor drive circuit 26 is operatively connected to motor 28 and energizes window motor 28 in response to the window command decision 38. Motor commutation sensor 30 detects motor rotation, as described above, and provides motor commutation pulses to a motor speed determination function 40. Each commutation pulse is a digital HIGH signal having a value of 5 volts. Motor speed determination function 40 determines the time period between motor commutation pulses. One skilled in the art will appreciate that the time period between commutation pulses is inversely related to motor speed. Since the time period between commutation pulses is functionally related to actual motor speed, the time period between commutation pulses will hereinafter, for convenience, be referred to as "motor speed indication signal" or ("MS"). As actual motor speed increases, MS decreases. Motor speed determination function 40 provides the motor speed indication signal to a noise filter 42.

The filtered motor speed signal is coupled to (i) a reference motor speed indication signal calculation function 44, and (ii) a sensitivity calculation function 46. Noise filter 42 is used to distinguish actual motor commutation pulses from noise by monitoring (i) the motor speed indication signal, and (ii) the value of the commutation pulse for a predetermined time period. When the time period of the motor speed indication signal is less than a predetermined time period, indicating the motor is rotating at a speed that is faster than the a maximum desired speed while moving the window, noise filter 42 does not output the commutation pulse to the reference motor speed indication signal calculation function 44, or to the sensitivity calculation function 46. Noise filter 42 also distinguishes valid pulses from invalid pulses. A valid commutation pulse has a "clean trailing edge." The voltage value of the commutation pulse is compared to a threshold voltage value over the time duration of the pulse. If the value of the commutation pulse is greater than the threshold value for a predetermined time, the pulse is considered to have a clean trailing edge and is considered a valid pulse. When a commutation pulse satisfies the noise filter conditions described above and is indicative of (i) motor speed which is not too fast, and (ii) a valid pulse with a clean trailing edge, the commutation pulse is provided as an input to reference motor speed indication signal calculation function 44, and sensitivity calculation function 46.

According to the present invention, reference motor speed indication signal calculation function 44 determines a reference motor speed indication value by determining a running average of the motor speed indication signals over 16 commutation pulse intervals ("samples"). Preferably, reference motor speed indication signal calculation function 44 is a 16 sample filter. Reference motor speed indication signal calculation function 44 is electrically connected to a comparing function 48. The reference motor speed indication value (i.e., the value indicative of the average period of the commutation signal over the last 16 pulses) is provided as an input to sensitivity calculation 46, and to a comparing function 48.

Sensitivity calculation function 46 is operatively connected to a memory 50. Sensitivity calculation function 46 calculates a sensitivity value ("K") which is used to adjust the trap force, i.e., the amount of force the controller will permit to be exerted against the window before motor reversal or motor stopping will occur. Trap force, in accordance with the present invention, is functionally related to the motor speed indication signal. The total forces resisting upward window movement and thus causing a "soft trap" condition may arise not only from an obstruction impeding the motion of the window but also from systemic changes in the power window system, such as mechanical wear, attenuation, and changing motor efficiency. As time passes, mechanical wear and attenuation add more "drag" to the window open/close mechanism 32. Also, changing operating environments, e.g., temperature, moisture, affect (i) motor efficiency and (ii) window operation.

The sensitivity value determined in sensitivity calculation 46 is functionally related to "drag" on the power window system. The sensitivity value is adapted to account for changes to the window operating efficiency. If the system were to use a static predetermined threshold for trap force, the controller would be unable to compensate for the changing drag on the system due to the mechanical wear and attenuation, motor efficiency changes, and environmental changes. The anti-trap system of the present invention adapts or adjusts the sensitivity value to thereby adjust the trap force required to reverse the window movement in response to an obstruction and systemic changes. If these changes are not considered in the determination of a soft trap condition, a false soft trap determination may be made.

The sensitivity value "$K_x$" is a number stored in memory in a manner discussed below. Each anti-trap sub-zone $SZ_2$–$SZ_{33}$ has a corresponding sensitivity value $K_2$–$K_{33}$. Each value $K_x$ is a minimum determined sensitivity value associated with a zone x. The trap force for the trap zone, $Z_{34}$, has a static sensitivity value $K_{34}$. The trap force for the trap zone $Z_1$ has a static value of $K_1$. Each sensitivity value $K_2$–$K_{33}$ is updated during a system calibration mode each time a commutation pulse is provided as an output from noise filter 42 for the anti-trap sub-zone that the window is presently located. The sensitivity values for the trap sub-zones are stored in memory 50. A plurality of zones is used because drag on the power window system, and subsequent changes on drag, are not uniform throughout the range of window motion.

Memory 50 is operatively connected to a function 52 which calculates an adjusted motor speed indication signal. The resulting adjusted motor speed indication signal is electrically connected to one input of a comparing function 48. Memory 50 provides the previously stored sensitivity value $K_x$ for the trap sub-zone in which the window is presently located to adjusted motor speed indication signal calculation 52. Adjusted motor speed indication signal calculation 52 multiplies the motor speed indication signal MS by the stored sensitivity value $K_x$ to determine an adjusted motor speed indication signal value ("AMS"). The adjusted motor speed indication signal value is provided as an input to comparing function 48. The new sensitivity value $K_x$ is updated, if needed, with each monitored commutation pulse. Updating of the sensitivity value $K_x$ in this manner provides one aspect of the adaptive feature of the present invention.

Comparing function 48 is electrically connected to a fault counter 54. At each occurrence of a valid commutation pulse, comparing function 48 compares the adjusted motor speed indication signal value AMS with the reference motor speed indication value RefMS. When the AMS value is greater than or equal to the RefMS value, i.e., the motor speed is less than an average motor speed by a predetermined amount, comparing function 48 outputs a fault signal to increment a fault counter 54. The greater the sensitivity value $K_x$, the lower the trap force required to trigger the comparing function 48 and hence, a soft trap.

Fault counter 54 is electrically connected to a trap decision function 56. When fault counter 54 has a count that is greater than three (3), thereby indicating the occurrence of three or more consecutive fault detections, a trap signal is provided to trap decision 56. When the AMS value is less than the RefMS value, comparing function 48 provides a reset signal to fault counter 54 and the fault count is reset to zero (0). A different number of fault occurrences may be used to provide a trap signal to trap decision 56. Trap decision 56 is electrically connected to the window command decision 38. When trap decision 56 receives a trap signal from fault counter 54, i.e., when three consecutive faults have occurred, trap decision 56 sets the trap flag. Fault counter 54 is reset each time a new window command is provided by window command decision 38.

Noise filter 42 is also electrically connected to a window position determining function 58 and a motor stall detection function 60. Window command decision 38 is also electrically connected to window position determination function 58 and provides the direction of present window movement, i.e. up, down, stopped, as an input to window position determination function 58. Window position determining function 58 determines the present location of the window by counting the total number of window motor commutation pulses. The counter counts up or down according to the direction of motor rotation. Total window position counts for a particular vehicle window may be, for example, 500 commutation pulses or window position counts, from a fully closed position to a fully open position. Different vehicle windows may have different counts between full closed and full opened. The zero (0) window position count represents a fully closed window and the 500 window position count represents the fully opened window position.

As described above, the motor 28 provides two commutation pulses per full revolution of the motor, each commutation pulse corresponding to approximately 1 mm of window movement. A present window position count in the window position determination function 58 is updated by decrementing the window position count when the window is moving in an upward direction. When the window moves in a downward direction, the window position counter is incremented.

Window position determining function 58 is electrically connected to a window zone determination function 62. Window position determining function 58 provides the window position count as an input to window zone determination function 62. Window zone determination function 62 is electrically connected to memory 50.

As described above, the trap zone is divided into 32 approximately equal sub-zones identified as $SZ_2$–$SZ_{33}$. The trap zone $Z_1$ extends from the window closed position count of 0 mm to the 4 mm window position count. Each sub-zone is 8 mm in length in a direction parallel to the direction of movement of the window. Therefore, each sub-zone $SZ_2$–$SZ_{33}$ has 8 commutation pulses or window position counts within the sub-zone. The 32 sub-zones extend from the 4 mm position count to the 260 mm position count. A trap can only occur in the area between $SZ_2$–$SZ_{33}$. The trap zone $Z_{34}$ extends from the 260 mm position count to the 500 mm position count.

The present window position count from determination 58 is correlated with the position count of the sub-zones in determination function 62 and the present window position zone is provided as an input to memory 50. The identified window zone is used to access the memory 50 and thereby supply the appropriate sensitivity value $K_x$ to the adjusted motor speed indication signal calculation function 52. Recall that the sensitivity value $K_x$ is zone dependent. The window zone determination function 62 also calibrates the window zones when a window calibration flag is set.

The window calibration flag is set by the window position determination function 58 each time the window position count is greater than the 260 mm position count and the window movement is in an upward direction. The window zones are calibrated to compensate for possible missed commutation counts, excess false commutation counts which pass through the filter 42, and physical changes to the window system, such as compression of the window seals. Physical changes of the window system may result in full window travel from, for example, the 0 mm position to a window open position of 502 mm as the seals become compressed over time. The adjusted or adaptive zone and sub-zone position count ranges are provided to memory 50 to be used with the associated sensitivity values. The anti-trap zone and sub-zone calibration is another adaptive feature of the present invention.

The window command decision function 38 is also connected to the motor stall detection function 60. Motor stall detection function 60 starts an internal timer each time the window command decision 38 issues a motor drive command. The stall detection function 60 resets its internal timer function upon receipt of each commutation pulse from noise filter 42. When the timer of function 60 exceeds a predetermined period, e.g., 60 milliseconds, without receiving another commutation pulse from noise filter 42, a window stall is considered to have occurred. The output of motor stall detection function 60 is electrically connected to window command decision 38. When a window stall condition is detected, motor stall detection function 60 provides a trap signal to trap decision function 56 which, in turn, sets the trap flag mentioned above.

Referring to FIGS. 3–7, the control process of the present invention is shown. Specifically, in FIG. 3 the main control routine is shown. In step 100, internal memories, flags, counters, and timers are reset to initial power-up values. The vehicle electrical system is originally powered by connecting the vehicle battery to the electrical system. Step 100 occurs whenever the vehicle electric power supply has been disconnected from the vehicle electrical system and reconnected, e.g. during vehicle servicing. The process then proceeds to step 102 where an initialization subroutine is executed.

Figure 4:
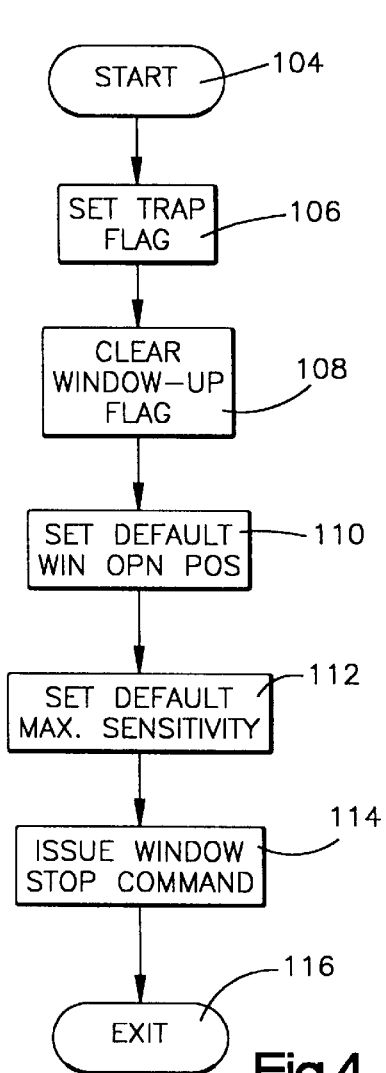
FIGS. 3–8 are flow diagrams showing the control process of the present invention.

Referring specifically to FIG. 4, the initialization subroutine for step 102 is shown. In step 104, the initialization subroutine starts. The process proceeds to step 106 where the trap flag is set. Next, in step 108, the window up-again flag is cleared. Steps 106 and 108 are preparatory steps assuring that the window will move in a downward direction upon the first actuation of a window switch 22 once the vehicle electrical system is repowered after vehicle servicing regardless of the selected direction of window movement through switch 22. In step 110, the window open position is set in window zone determination function 62 at the default position count of 500. The process then proceeds to step 112, where the default maximum sensitivity values $K_x$ are set in memory 50 for each trap sub-zone. This resetting of sensitivity values is necessary because all memorized sensitivity values are lost when the vehicle battery is disconnected. The maximum default sensitivity values for each type of vehicle system is empirically determined. A typical maximum default sensitivity value is 0.98, which is derived from 250/256. The numerator in this determination will change when the sensitivity value for a zone is adjusted. Next, in step 114, a window stop command is issued from window command decision 38.

Referring again to FIG. 3, the process then proceeds to step 118. In step 118, a determination is made as to whether a switch command has been received from window switch 22. If the determination in step 118 is negative, the process proceeds to step 120 where a determination is made (by checking the states of the relay driver control signals) as to whether the window motor is being commanded to move. If the determination in step 120 is affirmative, the process returns to step 118. If the determination in step 120 is negative, the process proceeds to step 122 where controller 24 checks if the window up-again flag is set. If the window up-again flag is not set, the process proceeds to step 124 where the electrical power to the commutation circuit of motor 28 is shut off. The process then loops back to step 118. If the determination in step 122 is affirmative, i.e., the window up-again flag is set, the process proceeds to step 126 where window command decision 38 issues a window-up command. The process then loops back to step 118.

If the determination in step 118 is affirmative, i.e., a switch command has been received from window switch 22, the process proceeds to step 144 where a determination is made as to whether the same command has been received for 50 ms (This determination is the switch debounce function 36 previously referred to with respect to FIG. 2). If the determination is negative, the process returns to step 118. If the determination is affirmative, the switch command is considered to be valid.

Figure 5:
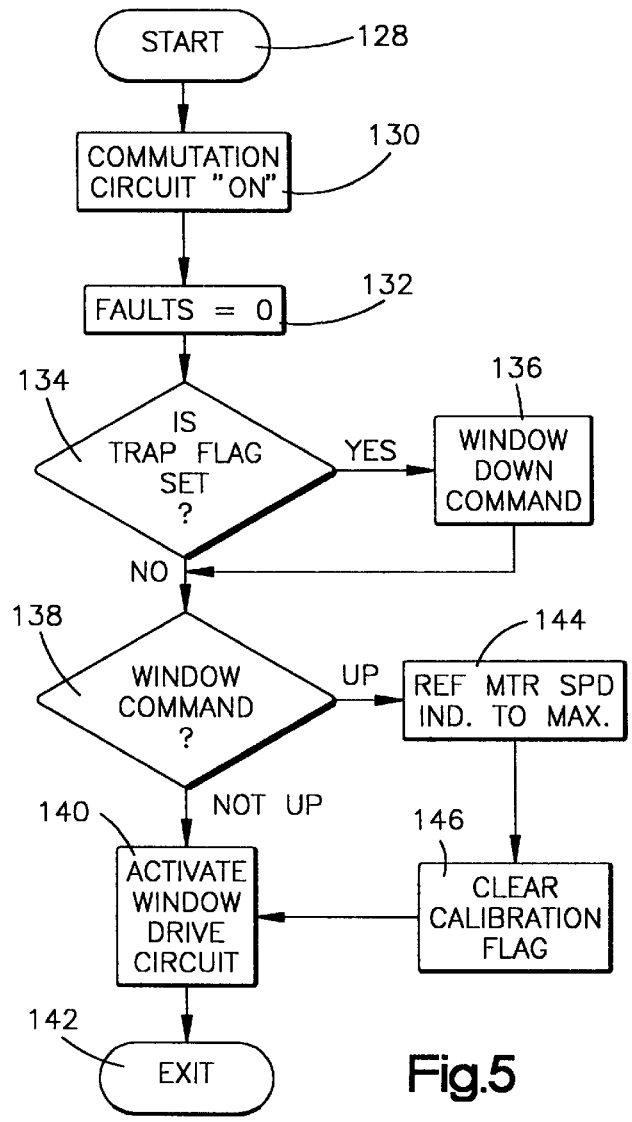

In step 146, a determination is made as to whether motor 28 is stopped. If the determination is affirmative, the process proceeds to step 148. In step 148, window command decision 38 issues a window command and the window command subroutine shown in FIG. 5, is initiated at step 128. If the determination in step 146 is negative, i.e., window motor 28 is moving, the process proceeds to step 152 where the switch command is set to null, which corresponds to a window stop command (step 152 included so as to stop the motor when the window motor is moving the window in an automatic mode and the occupant actuates switch 22 to override the presently executing window command). In step 156, the window up-again flag is cleared. This command "informs" controller 24 that the present window command is a manual command and not a command in response to a window trap occurrence. The process then proceeds to step 148 where a window command and the window command subroutine shown in FIG. 5 is initiated at step 128.

Referring to FIG. 5, the window command subroutine is shown. In step 128, the window command subroutine is called from step 148 or step 156 and the subroutine starts. The process proceeds to step 130 where the electrical supply to the commutation circuit of motor 128 is turned "ON". Next, in step 132, window command decision 38 resets the fault counter 54 to zero. This step prevents the system from carrying faults from a previous window command. The process then proceeds to step 134 where a determination is made as to whether the trap flag is set. If the determination is affirmative, the process proceeds to step 136 where any extant window command decision is overridden, and a window down command instead generated. The process then proceeds to step 138. If the determination in step 134 is negative, i.e., the trap flag is not set, the process proceeds from step 134 to step 138. In step 138, a determination is made as to the direction of the window command. If the determination indicates that the direction is not up, the process proceeds to step 140 where the window command decision is acted upon by providing a control signal to motor drive circuit 26 actuating motor 28 in a direction which moves window 34 in a downward direction. The process then proceeds to step 142 and exits the subroutine.

If the determination in step 138 indicates that the direction of the window command is up, the process proceeds to step 144 where the reference motor speed indication value is set to an initial maximum value, i.e., a value representative of the slowest expected motor speed. In step 146, the calibration flag is cleared. The calibration process is not used prior to initial motor rotation and the generation of commutation pulses by motor commutation sensor 30. The process then proceeds to step 140 where a control signal is provided to motor drive circuit 26 to actuate motor 28 in a direction which moves window 34 in an upward direction. The process then proceeds to step 142 and exits the subroutine, returning to step 150 in FIG. 3.

Returning now to FIG. 3, in step 150 a determination is made as to whether the same switch command has been received for 0.25 seconds. This determination is accomplished through the aid of a timer internal to the controller. When switch 22 is actuated, the timer begins timing out. The state of the timer is tested in step 150. If the determination is negative, indicating that the current switch command has existed for less than 0.25 seconds, the process returns to step 118. A switch command held for less than 0.25 seconds (and greater than the required 50 milliseconds) actuates the automatic power window mode. As the process returns to step 118, the determination in step 118 will be negative thereby indicating that there is no current switch command being received from switch 22. The determination in step 120 will be affirmative thereby indicating that the motor is moving. The process then loops again to step 118 and repeats the loops until a stall is detected or a new manual switch command is initiated to change or stop the presently executing window movement.

If the determination in step 150 is affirmative, indicating that the same switch command has been received for a time period greater than 0.25 seconds, the process proceeds to step 158. In step 158, a determination is made as to whether the same switch command is being received from switch 22. If the determination in step 158 is affirmative, indicating that the operator is continuing to hold the switch 22 in the same position, the process loops back upon itself. When the determination in step 158 is negative, indicating that the operator has released the switch or changed the switch command, the process proceeds to step 160. In step 160, the window up-again flag is cleared. This command "informs" controller 24 that the present window command is a manual command and not a command in response to a window trap occurrence. The process then proceeds to step 162 where a window stop command is issued thereby again executing the window command subroutine shown in FIG. 5.

Figure 6A:
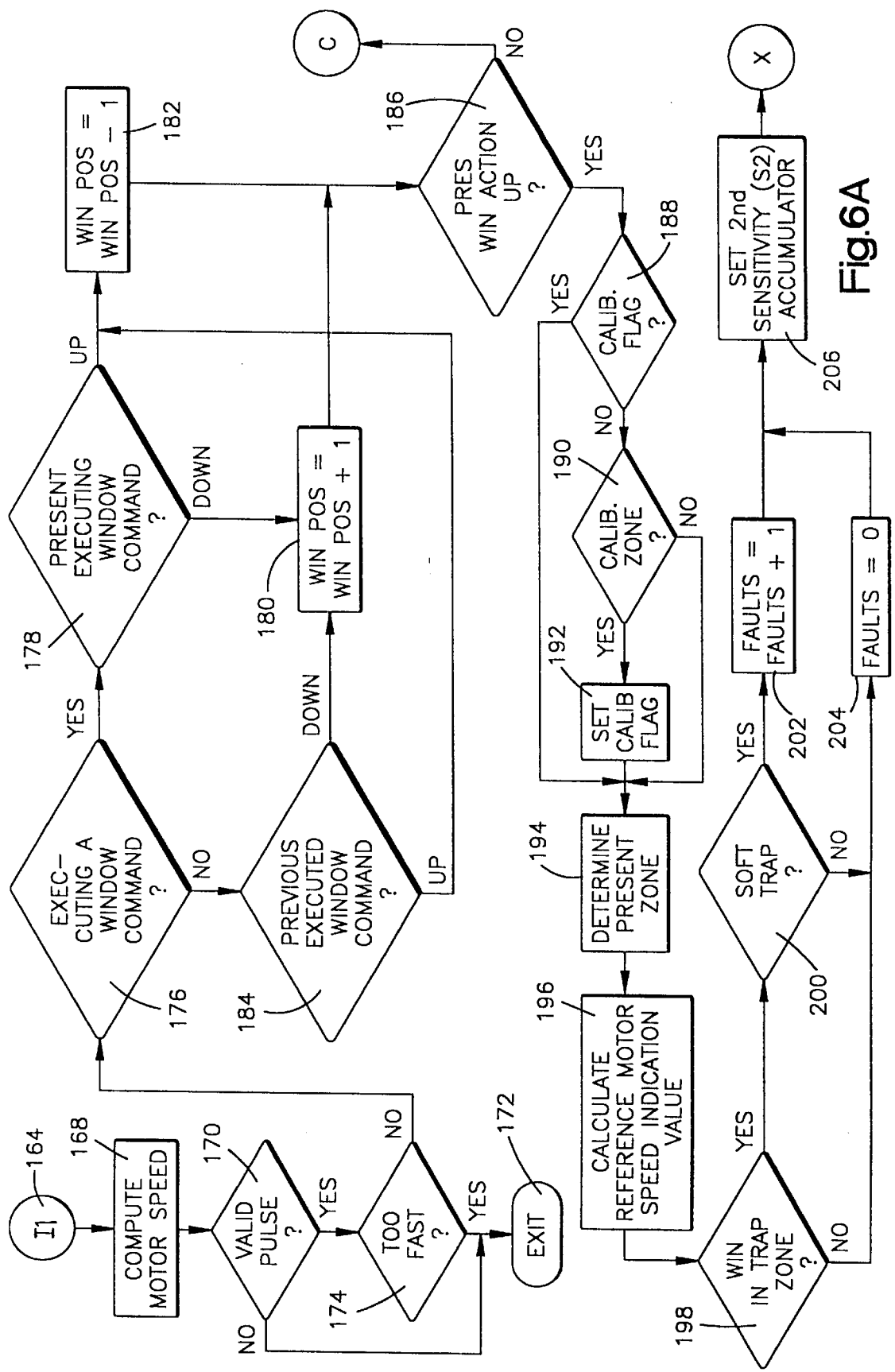
Figure 6B:
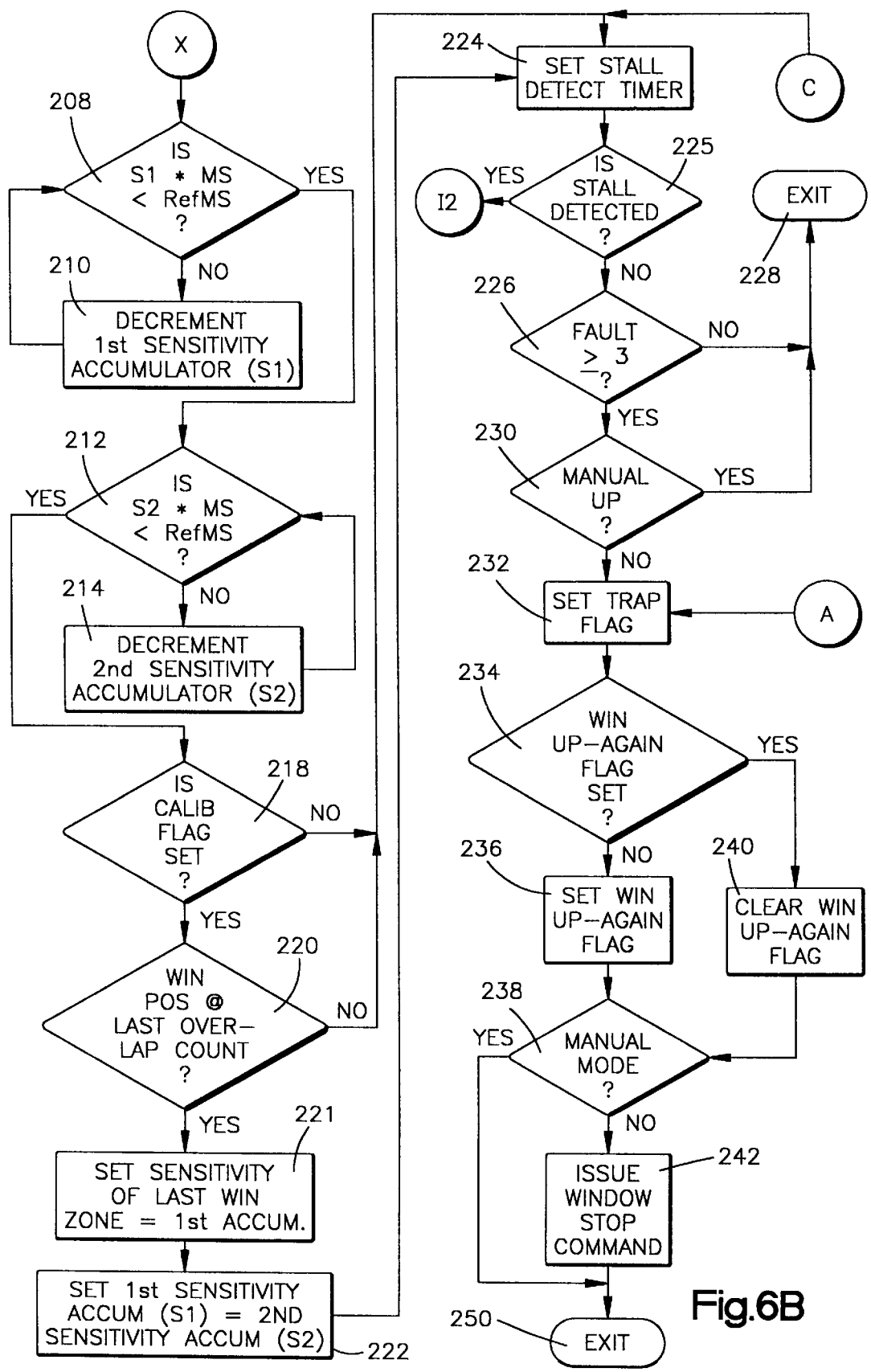
Figure 7:
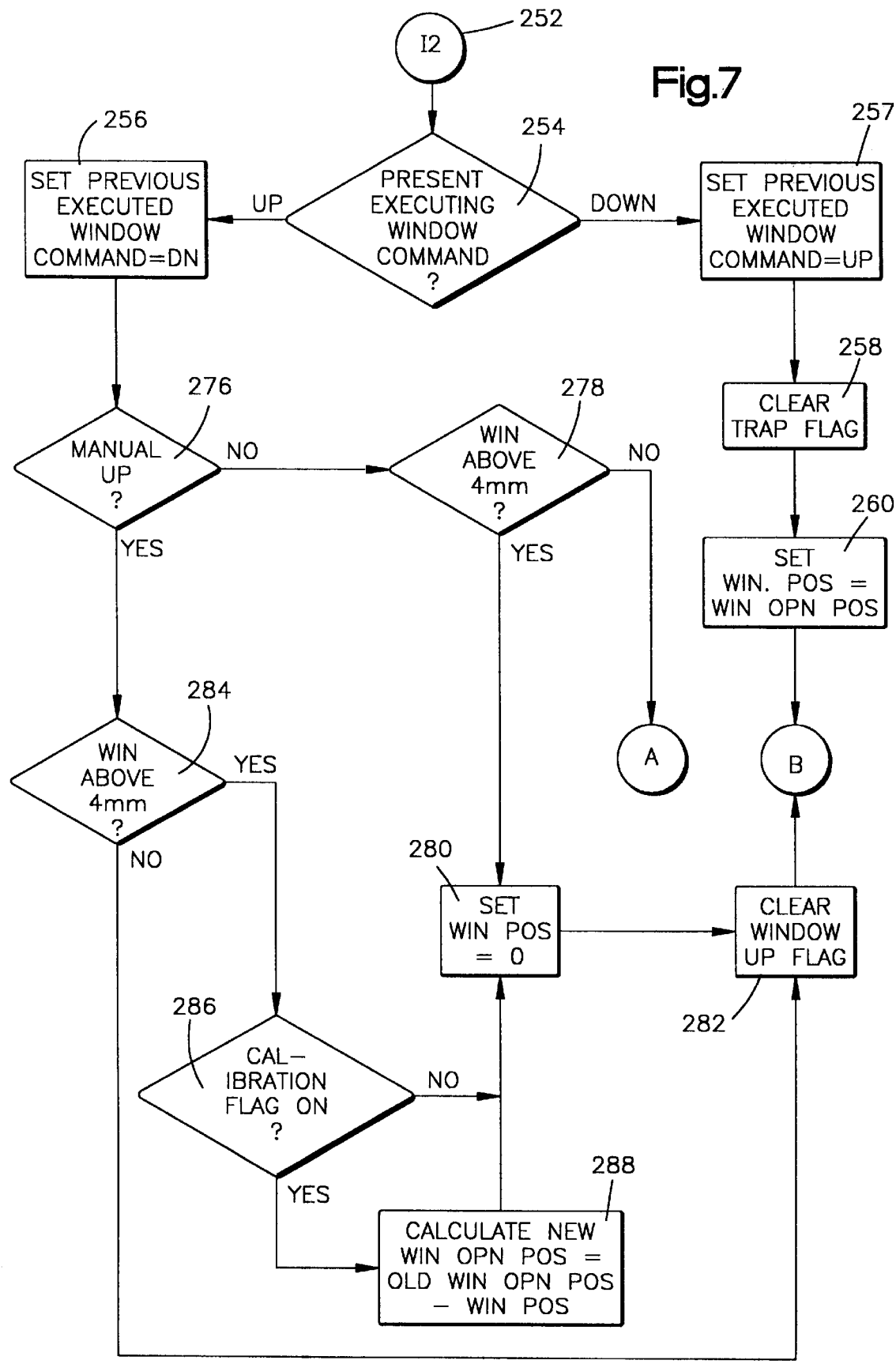

When motor 28 is rotating and moving window 34, each occurrence of a motor commutation pulse initiates the soft trap and stall interrupt routines. The soft trap interrupt routine I1 is shown in FIGS. 6A and 6B. The window motor stall interrupt routine I2 is shown in FIG. 7. It will be appreciated that the two interrupt routines share some common steps.

Referring to FIGS. 6A and 6B, the interrupt routine is initiated with each commutation pulse at step 164. In step 168, the motor speed indication signal is calculated (This step represents, or is equivalent to, the motor speed indication signal determining function 40 of FIG. 2, as described above). In step 170, a determination is made as to whether the commutation pulse is a valid commutation pulse (see step 42 of FIG. 2). If the determination is negative, the process proceeds to step 172 and exits the soft trap interrupt routine. If the determination is affirmative, the process proceeds to step 174 where a determination is made as to whether the motor is rotating at a speed that is faster than the expected motor speed while moving the window (in other words, whether the time interval since the last pulse is too short). If the determination is affirmative, the process proceeds to step 172 and exits the interrupt subroutine. If the determination is negative, the process proceeds to step 176.

In step 176, a determination is made as to whether motor drive circuit 26 is presently executing a window movement command. If the determination is affirmative, the process proceeds to step 178 where a determination is made as to what direction the present window command is moving window 34. If the determined direction is down, the process proceeds to step 180 where the window position count is incremented. The process then proceeds to step 186. If the determined direction is up, the process proceeds to step 182 where the window position count is decremented (these steps represent part of window position determination function 58). The process then proceeds to step 186.

If the determination in step 176 is negative, the process proceeds to step 184. In step 184, a determination is made as to the motor direction of the previously executed command. Window position determination function 58 stores the most recently executed command obtained from window command decision 38. The previously executed window command is stored in a memory location internal to controller 24. If the previous executed command was a window down command, the process proceeds to step 180 where window position determination function 58 increments the window position count. The process then proceeds to step 186. If the previous executed command was a window up command, the process proceeds to step 182 where window position determination function 58 decrements the window position count. The process then proceeds to step 186.

When motor 28 is just de-energized, the motor 28 and window open/close mechanism 32 have residual momentum. The just de-energized motor continues to rotate even though no command signal is provided to motor drive circuit 26. Commutation sensor 30 will still provide a pulse signal when the magnetic poles pass the sensor even though the motor is not receiving electric current from the vehicle electrical supply. Window position determination function 58 will still receive commutation pulse signals through filter 42 even though window command decision 38 is not providing a motor direction signal. These "momentum" pulses must be accounted for and the position count incremented or decremented accordingly to maintain an accurate position count for window zone determination function 62.

In step 186, a determination is made as to whether the present window action is in an up direction. If the determination is negative, the process proceeds to step 224 in FIG. 6B. If the determination in step 186 is affirmative, the process proceeds to step 188. In step 188, a determination is made as to whether the calibration flag is set, as described above. If the determination in step 188 is negative, the process proceeds to step 190 where a determination is made as to whether the window is in the calibration zone, i.e., the location is greater than the 260 mm position count. If the determination in step 190 is affirmative, the calibration flag is set in step 192. If the determination in step 190 is negative, the process proceeds to step 194. If the determination in step 188 is affirmative, indicating that the calibration flag is set, the process proceeds to step 194.

In step 194, window zone determination function 62 determines the position count representing the zone in which the window is presently located. Next, in step 196, reference motor speed indication signal calculation function 44 determines the reference motor speed indication signal value. The nineteen most recent motor speed indication signal values which pass through noise filter 42 are stored. Reference motor speed indication signal calculation function 44 is preferably a sixteen sample filter which determines the average value of sixteen of the last nineteen samples of motor speed indication signal values excluding the three most recent samples. In step 198, a determination is made as to whether the zone identified in step 194 is in an anti-trap zone having a position count greater than the 4 mm position count and less than the 260 mm position count. If the determination in step 198 is negative, the process proceeds to step 204 where window zone determination function 62 resets fault counter 54 to zero. The process then proceeds to step 206. If the determination in step 198 is affirmative, indicating that the window zone identified in step 194 is in an anti-trap zone, the process proceeds to step 200.

In step 200, a determination is made as to whether a fault condition exists. Adjusted motor speed indication calculation function 52 fetches the appropriate sensitivity value $K_x$ from memory 50 and multiplies the sensitivity value with the motor speed indication signal value (i.e., the inverse motor speed) obtained from noise filter 42 to provide the adjusted motor speed indication signal value "AMS" to comparing function 48. The AMS value is the inverse motor speed, i.e., as motor speed decreases, AMS increases. Comparing function also obtains a reference motor speed indication signal value "RefMS" from reference motor speed indication signal calculation function 44. The RefMS value is inversely related to the average motor speed. If comparing function 48 determined that AMS is greater than or equal to RefMS (i.e., the actual motor speed is less than the average motor speed), the process proceeds to step 202 where comparing function 48 outputs a pulsed fault signal to increment fault counter 54. The process then proceeds to step 206 which begins a sequence of steps to update the sensitivity values for the anti-trap sub-zone in which the window is presently located. Sensitivity calculation 46 receives window zone signals from window zone determination function 62 and motor speed indication signals through filter 42.

Sensitivity calculation 46 uses two internal accumulators to update the sensitivity value for a present zone. Each window trap sub-zone includes eight window position counts, the time period between each count being the motor speed indication signal. To update the sensitivity value for the sub-zone in which the window is presently located, the "$n^{th}$" sub-zone, sensitivity calculation 46 uses the motor speed indication signal value for these eight window position counts plus the motor speed indication signal values from two "overlapping" motor speed position counts from each of the adjacent sub-zones. The previous adjacent sub-zone being the "n−1" sub-zone and the next adjacent sub-zone being the "n+1" sub-zone. A total of twelve window position count motor speed indication signal values are used to determine the updated sensitivity value for the present window zone. It is because of the overlap in motor speed samples that two accumulators are required. The amount of overlap needed in the sensitivity determination is a function of the uncertainty in the window position. As described above, each sub-zone has a corresponding sensitivity value $K_2$–$K_{33}$. As the sensitivity calculation function 46 determines the sensitivity value for the present sub-zone, the sensitivity value S1 or S2 replaces the appropriate sensitivity value $K_2$–$K_{33}$ in memory 50.

A first sensitivity value S1 is initially set equal to a default value of 250/256. A second sensitivity value S2 is set equal to a default value of 250/256 for the initial and each subsequent execution of the interrupt routine. The process proceeds to step 208. In step 208, a determination is made as to whether the sensitivity value S1 multiplied by the motor speed indication value MS is less than the reference motor speed indication value RefMS. If the determination is affirmative, the process proceeds to step 212. If the determination in step 208 is negative, the process proceeds to step 210 where the sensitivity value S1 in the first accumulator S1 is decremented by one (i.e., 249/256) and the process loops back to step 208. The process remains in the 208, 210 loop until S1 satisfies the determination.

In step 212, a determination is made as to whether the sensitivity value S2 (i.e., 250/256) multiplied by the motor speed indication value MS is less than the reference motor speed indication value RefMS. If the determination in step 212 is affirmative, the process proceeds to step 216. If the determination in step 212 is negative, the process proceeds to step 214 where the sensitivity value S2 in the second accumulator is decremented by one (i.e., 249/256) and the process loops back to step 212. The process remains in the 212, 214 loop until S2 satisfies the determination.

Next, in step 218, a determination is made as to whether the calibration flag is set. If the determination is negative, the sensitivity values are not updated. The process proceeds to step 224. If the determination in step 218 is affirmative, the process proceeds to step 220.

In step 220, a determination is made as to whether the window position count is at the last overlap position count in the adjacent n+1 sub-zone. If the determination is negative, indicating that the second overlap sample in the n+1 zone has not been received, the process proceeds to step 224. If the determination in step 220 is affirmative, the process proceeds to step 221. As described above, the last two samples, the eleventh and twelfth, are in the next adjacent n+1 sub-zone. In step 221, the sensitivity value $K_x$ for the last sub-zone that the window was located, the "$n^{th}$" sub-zone, is set equal to the sensitivity value S1 in the first accumulator and is stored in memory 50. The process then proceeds to step 222 where the sensitivity value S1 of the first accumulator is set equal to the sensitivity value S2 in the second accumulator. Accumulator S1 finishes the sensitivity determination.

The stored sensitivity values derived from S1 and S2 are the $K_x$ terms used in fault determination discussed with regard to step 226 below. Those skilled in the art will appreciate that new sensitivity values $K_x$ are determined each time the window enters the calibration zone (step 190). Therefore, the sensitivity values adapt to account for changes in motor speed over time.

In step 224, a stall detect timer in motor stall detection function 60 begins timing out from the most recent commutation pulse. Next, in step 225, a determination is made as to whether a predetermined time period, e.g., 60 milliseconds, has expired before another valid commutation pulse is received. The time period in step 225 may vary for different vehicle window systems. If the determination in step 225 is affirmative, indicating that the predetermined time has expired and no additional valid commutation pulses have been received, the motor stall interrupt routine I2 shown in FIG. 7 is started. If the determination in step 225 is negative, indicating that a valid commutation pulse was received before the predetermined time period expired, the process proceeds to step 226.

In step 226, a determination is made in fault counter 54 as to whether the number of faults accumulated in step 202 is greater than three faults. If the determination in step 226 is negative, the process proceeds to step 228 and exits the interrupt routine. If the determination in step 226 is affirmative, the process proceeds to step 230 where a determination is made as to whether the window is operating in the manual up mode. If the determination in step 230 is affirmative, the process proceeds to step 228 and exits the interrupt routine. If the determination is negative, indicating the system is in the automatic up mode, the process proceeds to step 232 where trap decision 56 sets the trap flag. In step 234, a determination is made as to whether the window up-again flag is set. If the determination in step 234 is negative, indicating that a first trap condition has been detected, the process proceeds to step 236 where the window up-again flag is set. The process proceeds to step 238. If the determination in step 234 is affirmative, indicating that a second trap has been detected, the process proceeds to step 240 where the window up-again flag is cleared. Next, in step 238, a determination is made as to whether a manual operating mode is selected by a window switch operator. If the determination in step 238 is negative, indicating that the window is in the automatic up mode and a trap has been detected for a second time, the process proceeds to step 242 where window command decision function 38 issues a window stop command. The process then proceeds to step 250 where, the process exits the interrupt routine. If the determination in step 238 is affirmative, indicating the system is in the manual operating mode, the process allows the operator to override the system command and process exits the interrupt routine at step 250.

Referring to FIG. 7, the motor stall interrupt routine I2 is shown. The motor stall interrupt routine is initiated, in step 252, from an affirmative determination by motor stall decision function 60 in step 225. In step 254, a determination is made as to the direction of the presently executing window command during the motor stall. If the determined direction is up, the process proceeds to step 256 where the previous executed window command is set to down. If the determined direction is down, the process proceeds to step 257 where the previous executed window command is set to up. In step 258, the trap flag is cleared since the window stalled while moving in a downward direction. In step 260, since the window has stalled while moving in a downward direction, the window position count is set equal to the window open position count. The process then proceeds to step 262 in FIG. 8.

Figure 8:
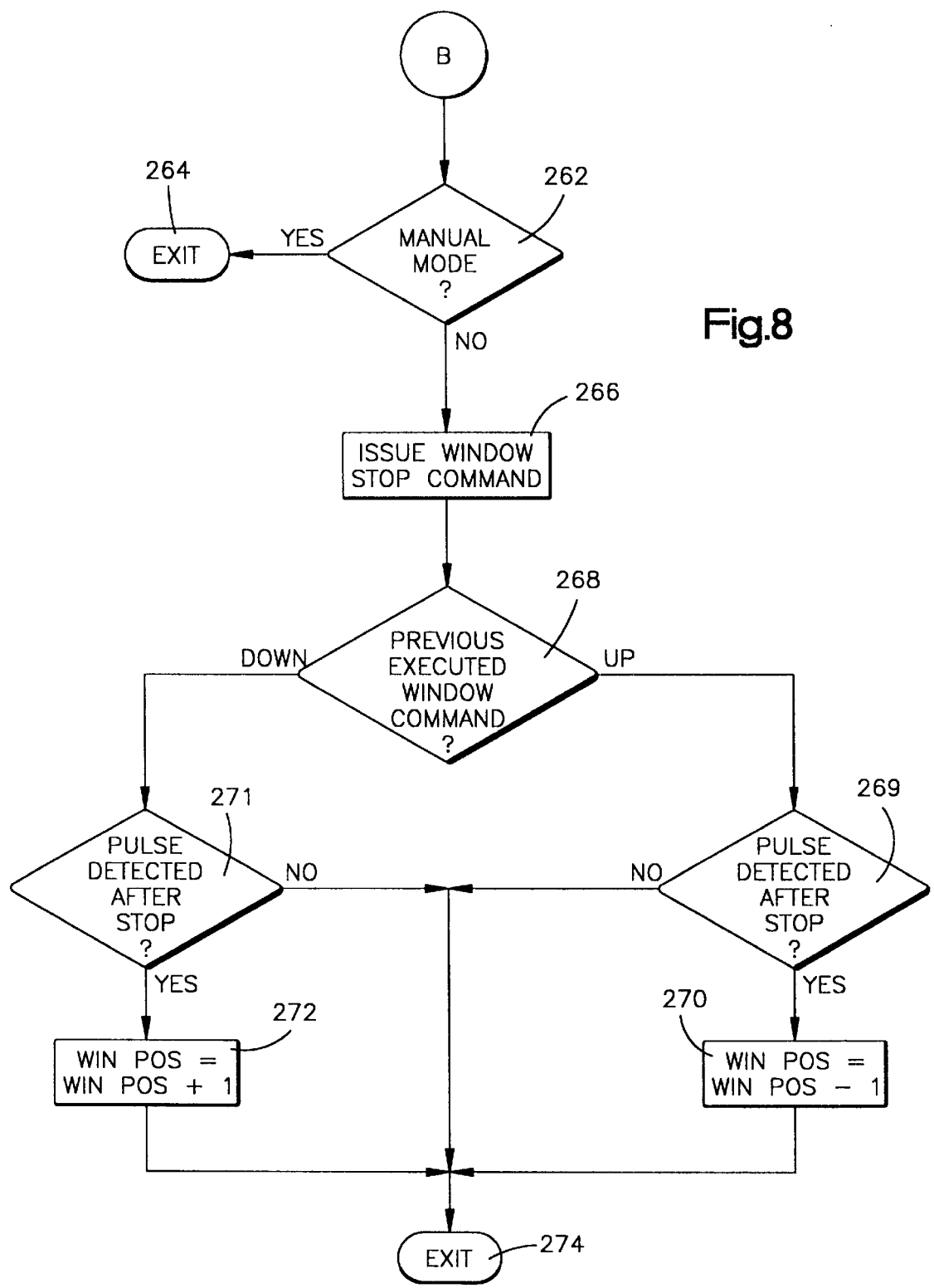

The sequence of steps shown in FIG. 8 are used to adjust the window position count when commutation pulses occur after a window stop command is issued from the motor stall interrupt routine. These post stop commutation pulses occur when a motor rotates into a stall, thereby causing the mechanical system in window open/close mechanism 32 to "wind up." When the force applied by the motor is removed, the mechanical systems "unwind," thereby causing the motor to rotate in the direction opposite to the previous commanded direction. The rotation of the motor poles past commutation sensor 30 cause commutation pulses. These commutation pulses must be accounted for by adjusting the window position count accordingly.

Referring to FIG. 8, in step 262, a determination is made as to whether the window is operating in the manual mode. If the determination in step 262 is affirmative, the process proceeds to step 264 to exit the interrupt routine. If the determination is negative, indicating automatic operation, the process proceeds to step 266. In step 266, window command decision 38 issues a window stop command. In step 268, a determination is made as to the direction of the previous executed command that was set in steps 256 and 257. If the previous command is up, the process proceeds to step 269 where a determination is made as to whether commutation pulses are detected after the stop command. If commutation pulses are detected, the process proceeds to step 270 where the window position count is decremented. The process proceeds to step 274 to exit the interrupt routine. If the determination in step 268 is that the previous command was down, the process proceeds to step 271. In step 271, a determination is made as to whether commutation pulses are detected after the stop command. If commutation pulses are detected, the process proceeds to step 272 where the window position count is incremented. The process proceeds to step 274 to exit the interrupt routine.

Referring to FIG. 7, as described above, if the determination in step 254 is that the window is moving up, the process proceeds to step 256 where the previous executed window command is set to down. In step 276, a determination is made as to whether the window is in a manual up mode. If the determination in step 276 is negative, the process proceeds to step 278. In step 278, a determination is made as to whether the window position count is greater than the 4 mm position count. If the determination in step 278 is negative, indicating operation in the anti-trap sub-zone, the process proceeds to step 232 in FIG. 6B where the trap flag is set. If the determination in step 278 is affirmative, the process proceeds to step 280 where the window position is set equal to zero. In step 282, the window up-again flag is cleared since the window is stalled at the window closed position. The process then proceeds to step 262 in FIG. 8.

If the determination in step 276 is affirmative, indicating a manual up command, the process proceeds to step 284. In step 284, a determination is made as to whether the window position count is above the 4 mm position count. If the determination in step 284 is negative, the process proceeds to step 282 where the window up-again flag is cleared. The process then proceeds to step 262 in FIG. 8. If the determination in step 284 is affirmative, the process proceeds to step 286. In step 286, a determination is made as to whether the calibration flag is set. If the determination in step 286 is negative, the process proceeds to step 280. If the calibration flag is set, the process proceeds to step 288. In step 288, a new window open position is calculated by setting the new window open position count equal to the window open position count minus the present window position. For example, if there is a residual window position count corresponding to the 2 mm position count when the window stalls in the manual up mode, the trap sub-zones will not be correct. By calibrating the new window open position to factor out the 2 mm position count, the trap sub-zones remain correct. The process then proceeds to step 280.

From the above description of the invention, those skilled in the art will perceive improvements, changes and modifications. Such improvements, changes and modifications within the skill of the art are intended to be covered by the appended claims.

Having fully described the invention, the following is claimed:

1. An apparatus for controlling an electric motor for moving a member between a first location and a second location, a plurality of locations for the member being between the first and second locations and being divided into a plurality of member location zones, said apparatus comprising:
   means for sensing operation of the motor and for providing a signal indicative thereof;
   means for determining an actual value of an operating parameter utilizing the signal from said means for sensing;
   means for generating an expected value of the operating parameter utilizing the actual value of the operating parameter;
   storage means for storing zone dependent values, each zone dependent value being associated with a respective member location zone;
   means for generating a zone dependent value associated with the member location zone within which the member is located utilizing the expected value of the operating parameter, and for supplying the generated zone dependent value to said storage means for storage therein;
   means for generating an adjusted value of the operating parameter using the associated zone dependent value from said storage means for the member location zone within which the member is located;
   means for comparing the expected value of the operating parameter against the adjusted value of the operating parameter; and
   means for controlling motor operation in response to said comparison.

2. An apparatus as set forth in claim 1, wherein said means for generating a zone dependent value includes means for utilizing the actual value of the operating parameter for the generation of the zone dependent value.

3. An apparatus as set forth in claim 2, wherein the operating parameter is motor speed and said means for determining an actual value includes means for determining actual motor speed.

4. An apparatus as set forth in claim 3, wherein said means for generating an expected value includes means for determining an average motor speed, and the expected value of the operating parameter is the average motor speed.

5. An apparatus as set forth in claim 2, wherein said means for comparing includes means for determining the relative magnitudes of the adjusted value of the operating parameter and the expected value of the operating parameter, and said means for controlling motor operation includes means for moving the member to the first position in response to at least a determination that the magnitude of the adjusted value of the operating parameter is greater than or equal to the magnitude of the expected value of the operating parameter.

6. An apparatus as set forth in claim 1, further including means for detecting a stall condition of the motor, and wherein said means for controlling is further responsive to said means for detecting a stall condition.

7. An apparatus as set forth in claim 1, wherein each of the member location zones defines a distance range of movement of the member, and all of the distance ranges are substantially equal.

8. An apparatus as set forth in claim 1, wherein said means for generating an adjusted value includes means for utilizing the actual value of the operating parameter for the generation of the adjusted value, and includes means for multiplying the actual value by the associated zone dependent value to provide the adjusted value.

9. An apparatus as set forth in claim 1, further including means for determining the current position of the member, and including means for determining the current zone within which the member is located.

10. An apparatus for controlling an electric motor for moving a member between a first location and a second location, a plurality of locations for the member being between the first and second locations and being divided into a plurality of member location zones, said apparatus comprising:
    means for sensing operation of the motor and for providing a signal indicative thereof;
    means for determining a first value using the signal from said means for sensing;
    means for determining a second value using the first value;
    storage means for storing zone dependent values, each zone dependent value being associated with a respective member location zone;
    means for determining the present zone within which the member is located;
    means for adjusting the first value dependent upon the determined zone and using an associated zone dependent value from said storage means;
    means for comparing the adjusted first value against the second value; and
    means for controlling motor operation in response to said comparison.

11. An apparatus as set forth in claim 10, further including means for adjusting at least one of the stored zone dependent values utilizing the first value.

12. An apparatus as set forth in claim 10, wherein the first value is actual motor speed and the second value is average motor speed.

13. An apparatus as set forth in claim 10, further including means for detecting a stall condition of the motor, and wherein said means for controlling motor operation is further responsive to said means for detecting a stall condition.

14. A method for controlling an electric motor for moving a member between a first location and a second location, a plurality of locations for the member being between the first and second locations and being divided into a plurality of member location zones, said method comprising:

sensing operation of the motor and providing a signal indicative thereof;

determining an actual value of an operating parameter utilizing the signal indicative of the sensed operation;

generating an expected value of the operating parameter utilizing the actual value of the operating parameter;

storing zone dependent values in storage means, each zone dependent value being associated with a respective member location zone;

generating a zone dependent value associated with the member location zone within which the member is located utilizing the expected value of the operating parameter;

supplying the generated zone dependent value to the storage means for storage therein;

generating an adjusted value of the operating parameter using the associated zone dependent value from the storage means for the member location zone within which the member is located;

comparing the expected value of the operating parameter against the adjusted value of the operating parameter; and controlling motor operation in response to the comparison.

15. A method as set forth in claim 14, wherein said step of generating a zone dependent value includes utilizing the actual value of the operating parameter for the generation of the zone dependent value.

16. A method as set forth in claim 15, wherein the operating parameter is motor speed and said step of determining an actual value includes determining actual motor speed.

17. A method as set forth in claim 14, wherein said step of comparing includes determining the relative magnitudes of the adjusted value of the operating parameter and the expected value of the operating parameter, said step of controlling motor operation includes controlling the member to move to the first position in response to at least a determination that the magnitude of the adjusted value of the operating parameter is greater than or equal to the magnitude of the expected value of the operating parameter.

18. A method as set forth in claim 14, further including detecting a stall condition of the motor, and wherein said step of controlling further includes controlling the motor responsive to a detected stall condition.

19. A method for controlling an electric motor for moving a member between a first location and a second location, a plurality of locations for the member being between the first and second locations and being divided into a plurality of member location zones, said method comprising:

sensing operation of the motor and providing a signal indicative thereof;

determining a first value using the signal indicative of motor operation;

determining a second value using the first value;

storing zone dependent values in storage means, each zone dependent value being associated with a respective member location zone;

determining the present zone within which the member is located;

adjusting the first value dependent upon the determined zone and using an associated zone dependent value from the storage means;

comparing the adjusted first value against the second value; and controlling motor operation in response to the comparison.

20. A method as set forth in claim 19, further including adjusting at least one of the stored zone dependent values utilizing the first value.

21. A method as set forth in claim 19, wherein the first value is actual motor speed and the second value is average motor speed.

22. A method as set forth in claim 19, further including detecting a stall condition of the motor, and wherein said step of controlling further includes controlling the motor responsive to a detected stall condition.

* * * * *